United States Patent
Tomizawa et al.

(10) Patent No.: US 10,497,513 B2
(45) Date of Patent: Dec. 3, 2019

(54) CERAMIC ELECTRONIC COMPONENT AND METHOD OF PRODUCING THE SAME

(71) Applicant: Taiyo Yuden Co., Ltd., Tokyo (JP)

(72) Inventors: Yuji Tomizawa, Tokyo (JP); Yasutomo Suga, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 77 days.

(21) Appl. No.: 15/234,488

(22) Filed: Aug. 11, 2016

(65) Prior Publication Data

US 2017/0047163 A1 Feb. 16, 2017

(30) Foreign Application Priority Data

Aug. 11, 2015 (JP) .................... 2015-158651

(51) Int. Cl.
*H01G 4/12* (2006.01)
*H01G 4/30* (2006.01)
*H01G 4/232* (2006.01)

(52) U.S. Cl.
CPC ............. *H01G 4/1227* (2013.01); *H01G 4/12* (2013.01); *H01G 4/232* (2013.01); *H01G 4/30* (2013.01)

(58) Field of Classification Search
CPC ........ H01G 4/1227; H01G 4/12; H01G 4/232; H01G 4/30
USPC ...................................... 361/301.4
See application file for complete search history.

(56) References Cited

U.S. PATENT DOCUMENTS

| 2009/0284897 | A1* | 11/2009 | Itamura | H01G 4/232 361/303 |
| 2009/0316329 | A1* | 12/2009 | Nomura | H01G 4/236 361/301.1 |
| 2010/0128411 | A1 | 5/2010 | Onishi et al. | |
| 2013/0100579 | A1* | 4/2013 | Morito | H01G 2/00 361/321.2 |
| 2015/0146344 | A1* | 5/2015 | Torigoshi | H01G 4/30 361/301.4 |
| 2016/0372255 | A1* | 12/2016 | Maki | H01F 27/2804 |

FOREIGN PATENT DOCUMENTS

| JP | S63-020816 A | 1/1988 |
| JP | 2010-129737 A | 6/2010 |
| JP | 2012222276 A | 11/2012 |
| JP | 2013065592 A | 4/2013 |

OTHER PUBLICATIONS

Office Action dated Nov. 20, 2018 in Japanese Application No. 2015-158651.

* cited by examiner

*Primary Examiner* — Michael P McFadden
(74) *Attorney, Agent, or Firm* — Saliwanchik, Lloyd & Eisenschenk

(57) ABSTRACT

There is provided a ceramic electronic component including: a ceramic chip having a first surface, a second surface facing the first surface, and a third surface connecting the first surface to the second surface; a first electrode unit disposed on the first surface; a second electrode unit disposed on the second surface apart from the first electrode unit; and a modified zone disposed on the third surface, and modified by irradiation of a high energy beam.

5 Claims, 8 Drawing Sheets

CERAMIC ELECTRONIC COMPONENT AND METHOD OF PRODUCING THE SAME

CROSS REFERENCE TO RELATED APPLICATION

This application claims the benefit under 35 U.S.C. § 119 of Japanese Patent Application No. 2015-158651, filed Aug. 11, 2015, which is herein incorporated by reference in its entirety.

BACKGROUND

The present invention relates to a ceramic electronic component including a pair of electrode units and to a method of producing the ceramic electronic component.

In recent years, accompanied by miniaturization and thinning of electronic devices such as a portable terminal and a wearable device, miniaturization and thinning of electronic components mounted to the electronic devices have been rapidly progressed. However, if the electronic components are increasingly thinned, a mechanical strength (bending strength) in a thickness direction thereof is lowered, and damage easily occurs when the electronic components are mounted.

Japanese Patent Application Laid-open Nos. 2012-222276 and 2013-65592 disclose a technology for improving a bending strength of a multi-layer ceramic capacitor. In the technology disclosed in Japanese Patent Application Laid-open No. 2012-222276, by disposing internal electrodes for reinforcement that do not contribute to a capacitance formation, the bending strength of the multi-layer ceramic capacitor is increased. In the technology disclosed in Japanese Patent Application Laid-open No. 2013-65592, the dielectric ceramics includes a plurality of types of crystal particles having different compositions, thereby improving the bending strength of the multi-layer ceramic capacitor.

BRIEF SUMMARY

However, in the technology disclosed in Japanese Patent Application Laid-open No. 2012-222276, in order to dispose the internal electrodes for reinforcement, it is necessary to provide areas that do not contribute to the capacitance formation, thereby inhibiting the multi-layer ceramic capacitor from being miniaturized and thinned. In the technology disclosed in Japanese Patent Application Laid-open No. 2013-65592, as the dielectric ceramics is needed to be controlled to have a special microstructure, a production process of the multi-layer ceramic capacitor becomes complicated.

Accordingly, there is a need for providing a technology that improves a bending strength of a thin ceramic electronic component in a simple process.

In view of the above-described circumstances, it is desirable to provide a ceramic electronic component having a high bending strength, and a method of producing the same.

According to an embodiment of the present invention, there is provided a ceramic electronic component including a ceramic chip, a first electrode unit, a second electrode unit, and a modified zone.

The ceramic chip has a first surface, a second surface facing the first surface, and a third surface connecting the first surface to the second surface.

The first electrode unit is disposed on the first surface.

The second electrode unit is disposed on the second surface apart from the first electrode unit.

The modified zone is disposed on the third surface, and is modified by irradiation of a high energy beam.

In the ceramic electronic component having this configuration, the modified zone reinforces the third surface, thereby improving a mechanical strength (bending strength) in a thickness direction perpendicular to the third surface.

The third surface may include a first covered part covered with the first electrode unit, and a second covered part covered with the second electrode unit.

The modified zone may be disposed between the first covered part and the second covered part.

On the third surface of the ceramic chip, the part not covered with the electrode units tends to have a weak bending strength. By this configuration where the modified zone is disposed on the part, a high bending strength can be provided.

The high energy beam may be laser.

The modified zone may include dispersed voids.

The third surface may be concave in the modified zone.

By the configuration where laser is used as the high energy beam, there is provided the modified zone that can successfully improve the bending strength of the ceramic electronic component.

The high energy beam may be an electron beam.

The modified zone may include a layer having a microstructure different from the ceramic chip.

By this configuration where an electron beam is used as the high energy beam, there is provided the modified zone that can successfully improve the bending strength of the ceramic electronic component.

The ceramic chip may include first internal electrodes, second internal electrodes, and di electric ceramics.

The first internal electrodes extend in parallel with the third surface, and are connected to the first electrode unit.

The second internal electrodes face the first internal electrodes, and are connected to the second electrode unit.

The dielectric ceramics covers the first internal electrodes and the second internal electrodes.

The dielectric ceramics may include titanium and barium as main components.

By this configuration, there is provided a ceramic capacitor having a high bending strength.

According to another embodiment of the present invention, there is provided a method of producing a ceramic electronic component, the method including preparing a ceramic structure, the ceramic structure including a ceramic chip having a first surface, a second surface facing the first surface, and a third surface connecting the first surface to the second surface, a first electrode unit disposed on the first surface, and a second electrode unit disposed on the second surface apart from the first electrode unit.

A region between the first electrode unit and the second electrode unit on the third surface is irradiated with a high energy beam.

According to another embodiment of the present invention, there is provided a method of producing a ceramic electronic component, the method including producing a ceramic structure having a first surface, a second surface facing the first surface, and a third surface connecting the first surface to the second surface.

An electrical conductive layer covering the first surface, the second surface, and the third surface is formed.

When the third surface is irradiated with a high energy beam to remove the electrical conductive layer, the electrical conductive layer is segmented between the first surface and the second surface.

By this configuration, no mask is formed on the third surface of the ceramic structure, and the electrical conductive layer is disposed on the entire surface thereof. When the third surface is irradiated with a high energy beam to remove the electrical conductive layer, the electrical conductive layer is segmented between the first surface and the second surface. In this way, the electrical conduction between the first surface and the second surface is cut off, the electrical conductive layer on the first surface functions as the first electrode unit, and the electrical conductive layer on the second surface functions as the second electrode unit. Thus, by this configuration, a pair of the electrode units apart from each other can be disposed using no mask, thereby simplifying the production process and improving mass productivity.

In addition, by this configuration, when the electrical conductive layer is removed by irradiating a high energy beam, the surface of the ceramic structure is exposed, and the high energy beam is incident on the exposed surface of the ceramic structure. Accordingly, the modified zone is inevitably formed at the region where the electrical conductive layer on the third surface of the ceramic structure is removed. That is to say, the third surface of the ceramic structure includes a region covered with the electrical conductive layer, and a region where the modified zone is disposed. Accordingly, the third surface of the ceramic structure has a high strength over the entire regions. As a result, the ceramic electronic component achieves a high bending strength as a whole.

The electrical conductive layer may have a thickness of 10 nm or more to 20 μm or less.

By this configuration, the electrical conductive layer can be surely removed in the modified zone, and the electrical conductive layer can successfully function as the electrode unit.

As the high energy beam, laser or an electron beam is used.

By this configuration, a good modified zone can be provided on the third surface of the ceramic structure.

According to the embodiments of the present invention, it is possible to provide a ceramic electronic component having a high bending strength, and a method of producing the same.

These and other objects, features and advantages of the present invention will become more apparent in light of the following detailed description of embodiments thereof, as illustrated in the accompanying drawings.

DETAILED DESCRIPTION

Hereinafter, an embodiment of the present invention will described with reference to the drawings.

In the figures, an X axis, a Y axis, and a Z axis orthogonal to one another are shown, as appropriate. The X axis, the Y axis, and the Z axis are common in all figures.

1. MULTI-LAYER CERAMIC CAPACITOR 10

1.1 Schematic Configuration

Figure 1:
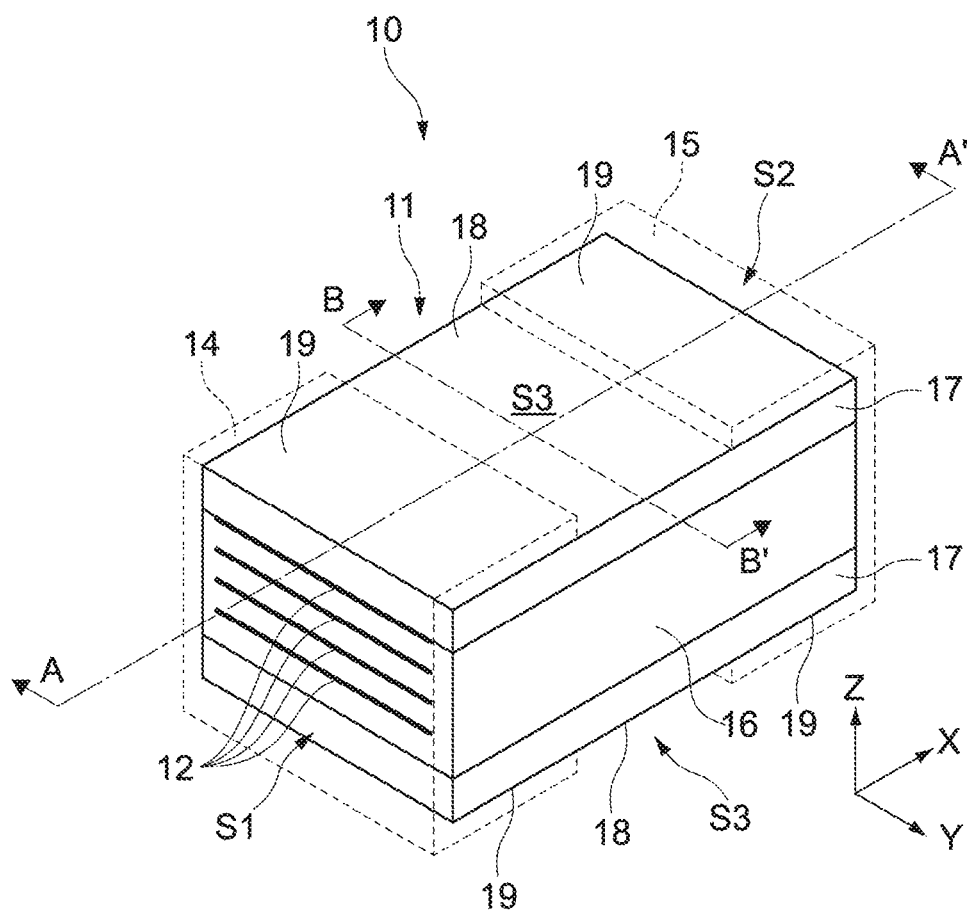
FIG. 1 is a perspective diagram of a multi-layer ceramic capacitor according to an embodiment of the present invention.
Figure 2:
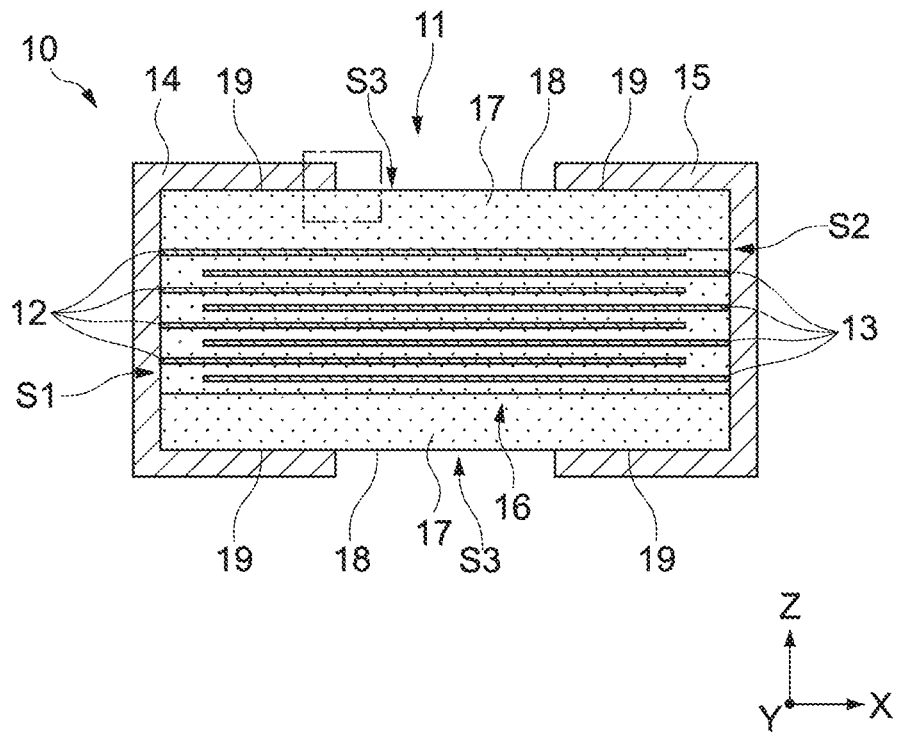
FIG. 2 is a cross-sectional diagram of the multi-layer ceramic capacitor taken along the A-A' line in FIG. 1.
Figure 3:
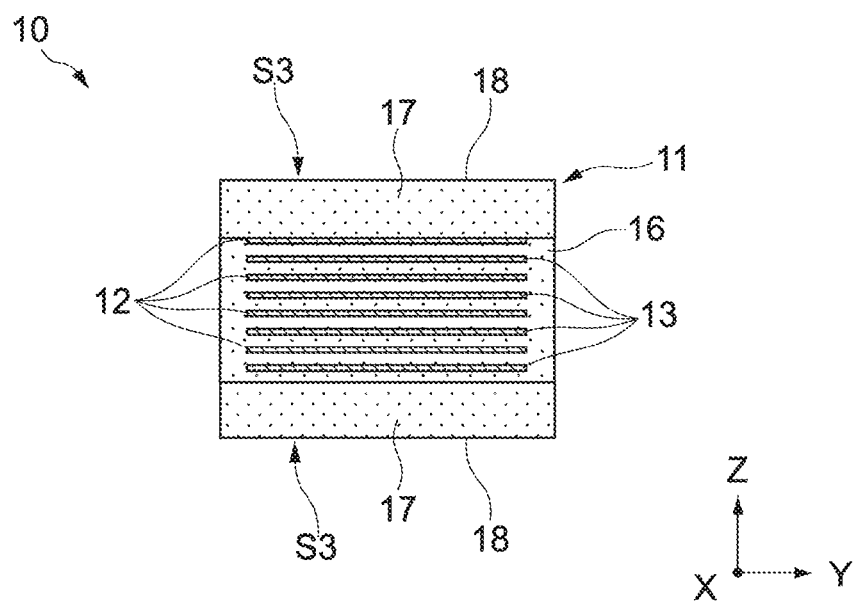
FIG. 3 is a cross-sectional diagram of the multi-layer ceramic capacitor taken along the B-B' line in FIG. 1.

FIGS. 1 to 3 each show a multi-layer ceramic capacitor 10 according to an embodiment of the present invention. FIG. 1 is a perspective diagram of the multi-layer ceramic capacitor 10. FIG. 2 is a cross-sectional diagram of the multi-layer ceramic capacitor 10 taken along the A-A' line in FIG. 1. FIG. 3 is a cross-sectional diagram of the multi-layer ceramic capacitor 10 taken along the B-B' line in FIG. 1.

The multi-layer ceramic capacitor 10 includes a ceramic chip 11, a first external electrode 14, and a second external electrode 15. In FIG. 1, the external electrodes 14, 15 are shown by dashed lines, and the ceramic chip 11 is shown through the external electrodes 14, 15.

The ceramic chip 11 is a rectangular parallelepiped having sides along the X axis, the Y axis, and the Z axis. The external electrodes 14, 15 configure a pair of electrode units of the multi-layer ceramic capacitor 10. Namely, the first external electrode 14 configures a first electrode unit of the multi-layer ceramic capacitor 10, and the second external electrode 15 configures a second electrode unit of the multi-layer ceramic capacitor 10.

The first external electrode 14 covers an end surface S1 of the ceramic chip 11 in the X axis direction, and extends from the end surface S1 to both main surfaces S3 of the ceramic chip 11, the main surfaces S3 facing each other in the Z axis direction. The second external electrode 15 covers an end surface S2 facing the end surface S1 of the ceramic chip 11, and extends from the end surface S2 to both the main surfaces S3 of the ceramic chip 11. In this manner, cross sections of the external electrodes 14, 15 in parallel with an X-Z plane are U-shaped.

The external electrodes 14, 15 extend from the end surfaces S1, S2 to one third area of each main surface S3 of the ceramic chip 11 in the X axis direction, respectively.

Accordingly, the external electrodes 14, 15 are apart via the one third area of each main surface S3 at the center in the X axis direction.

The ceramic chip 11 has a multi-layer unit 16 and covers 17. Each cover 17 has a flat plate shape extending along an X-Y plane. The covers 17 cover upper and lower surfaces of the multi-layer unit 16 in the Z axis direction. The main surfaces S3 are disposed on the upper surface of the cover 17 on an upper side in the Z axis direction, and on the lower surface of the cover 17 on a lower side in the Z axis direction.

The multi-layer unit 16 includes a plurality of first internal electrodes 12 and a plurality of second internal electrodes 13. The internal electrodes 12, 13 are sheets extending along the X-Y plane, and are disposed alternately in the Z axis direction. The first internal electrodes 12 are connected to the first external electrode 14, and are insulated from the second external electrode 15. The second internal electrodes 13 are connected to the second external electrode 15, and are insulated from the first external electrode 14.

The internal electrodes 12, 13 each is made of an electrical conductive material. As an electrical conductive material configuring the internal electrodes 12, 13, nickel (Ni), copper (Cu), palladium (Pd), platinum (Pt), silver (Ag), gold (Au), or a metal material including an alloy thereof is used, for example.

The multi-layer unit 16 and the covers 17 configuring the ceramic chip 11 are made of polycrystal of dielectric ceramics. That is to say, the ceramic chip 11 includes the internal electrodes 12, 13 covered with the dielectric ceramics.

In the multi-layer unit 16, the internal electrodes 12, 13 constitute a capacitance forming unit for forming a capacitance together with layers of the dielectric ceramics disposed therebetween. Also, in the multi-layer unit 16, the dielectric ceramics covering both ends of the capacitance forming unit in the Y axis direction constitute side margins. The covers 17 and the side margins of the multi-layer unit 16 mainly protect the capacitance forming unit of the multi-layer unit 16, and have a function to ensure insulation properties around the capacitance forming unit of the multi-layer unit 16.

As the dielectric ceramics, a material having a high dielectric constant is used in order to increase the capacitance of the capacitance forming unit of the multi-layer unit 16. In this embodiment, as the dielectric ceramics, a material having a Perovskite structure (barium titanate ($BaTiO_3$) based material) including titanium (Ti) and barium (Ba) is used.

By the above-described configuration, in the multi-layer ceramic capacitor 10, when a voltage is applied between the first external electrode 14 and the second external electrode 15, a voltage is applied among the plurality of layers of the dielectric ceramics between the first internal electrodes 12 and the second internal electrodes 13. In this manner, in the multi-layer ceramic capacitor 10, a charge corresponding to the voltage applied between the first external electrode 14 and the second external electrode 15 is stored.

In general, in the multi-layer ceramic capacitor 10, the part covered with the external electrodes 14, 15 of the ceramic chip 11 has a high mechanical strength in the Z axis direction (hereinafter also referred to as "bending strength") by a reinforcing function of the external electrodes 14, 15. On the other hand, the part not covered with the external electrodes 14, 15 of the ceramic chip 11 is difficult to have a high bending strength.

In recent years, the multi-layer ceramic capacitor 10 has become small and thin in the Z axis direction. In the thin multi-layer ceramic capacitor 10, the bending strength easily decreases. Accordingly, in the thin multi-layer ceramic capacitor 10, in the part not covered with the external electrodes 14, 15 of the ceramic chip 11, the bending strength especially easily decreases.

The multi-layer ceramic capacitor 10 according to this embodiment includes modified zones 18 for enhancing the bending strength of the part not covered with the external electrodes 14, 15 of the ceramic chip 11. Hereinafter, the modified zones 18 will be described in detail.

1.2 Modified Zones 18

As shown in FIGS. 1 to 3, the modified zones 18 are disposed at the center regions not covered with the external electrodes 14, 15 on both the main surfaces S3. In other words, the modified zones 18 are disposed between covered parts 19 covered with the external electrodes 14, 15 on the main surfaces S3. The modified zones 18 are modified by irradiating a high energy beam.

Accordingly, each main surface S3 of the multi-layer ceramic capacitor 10 includes the parts covered with the external electrodes 14, 15 and the modified zone 18. The bending strength of the modified zones 18 is enhanced by irradiating a high energy beam for modification, in other words, all regions of the main surfaces S3 of the multi-layer ceramic capacitor 10 have high strength. As a result, the multi-layer ceramic capacitor 10 has a high bending strength.

Examples of the high energy beam irradiated in order to form the modified zones 18 include laser and an electron beam. Hereinafter, the modified zones 18 formed by using (1) laser and (2) electron beam as the high energy beam will be described by way of example.

(1) Laser

Figure 4:
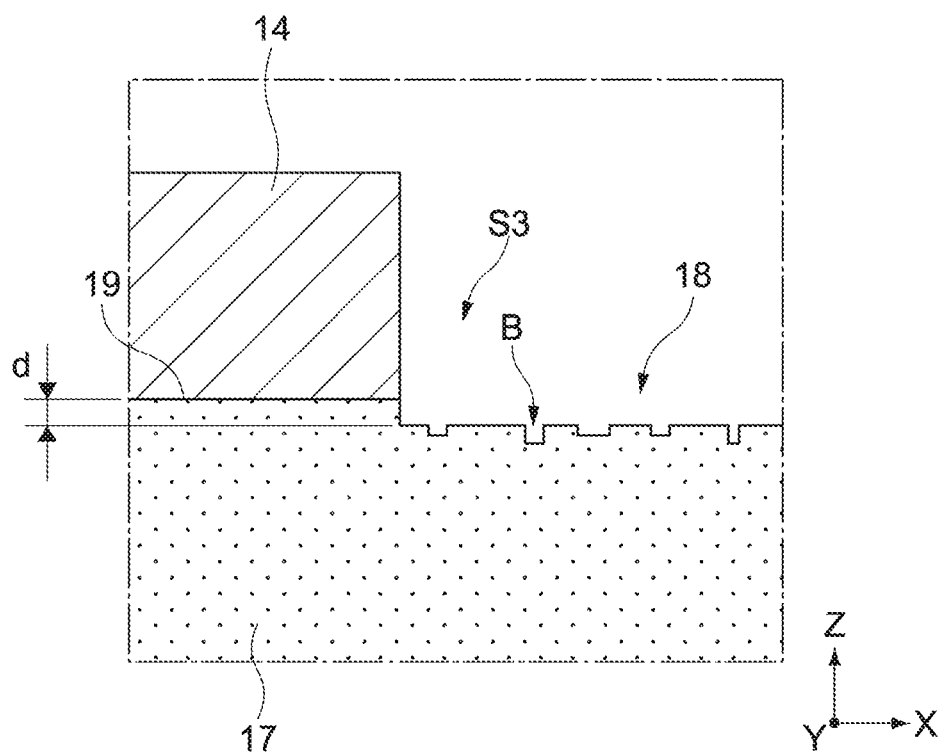
FIG. 4 is an enlarged partial cross-sectional diagram of an area surrounded by a chain line of the multi-layer ceramic capacitor in FIG. 2.
Figure 5A:
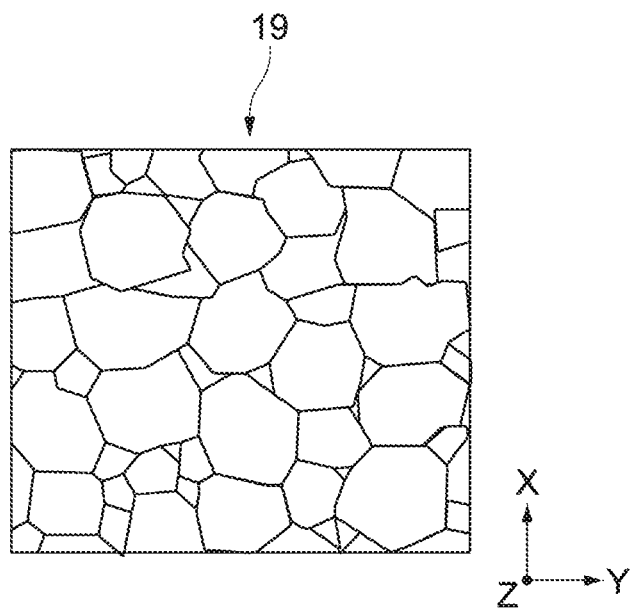
FIG. 5A is a schematic diagram showing a surface microstructure of a covered part of the multi-layer ceramic capacitor.
Figure 5B:
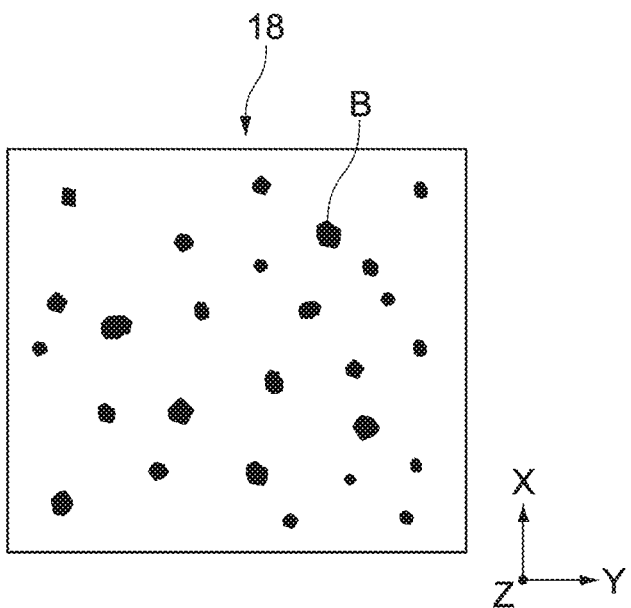
FIG. 5B is a schematic diagram showing a surface microstructure of a modified zone of the multi-layer ceramic capacitor.

FIG. 4 is an enlarged schematic diagram of an area surrounded by a chain line of the multi-layer ceramic capacitor 10 in FIG. 2 where the modified zones 18 are formed by scanning laser having a predetermined spot diameter. FIGS. 5A and 5B each is a schematic diagram showing a surface microstructure of the main surfaces S3 of the ceramic chip 11. FIG. 5A shows the covered part 19, and FIG. 5B shows the modified zone 18.

As shown in FIG. 4, the modified zone 18 is engraved in a depth d by laser irradiation. That is to say, there is a level difference between the modified zone 18 and the covered part 19, and the main surfaces S3 are each concave. The depth d of the modified zone 18 can be controlled freely by a laser intensity, an irradiation time, an irradiation number, etc., and may be about 2 µm, for example.

The covered part 19 not laser-irradiated is formed of polycrystal of dielectric ceramics. When the surface microstructure of the covered part 19 is observed, a crystal grain boundary of the dielectric ceramics is clearly identified, as shown in FIG. 5A.

On the other hand, when the surface microstructure of the modified zone 18 laser-irradiated is observed, the crystal grain boundary is little identified, as shown in FIG. 5B.

Furthermore, as shown in FIG. 4 and FIG. 5B, voids B are dispersed in the modified zone 18.

Based on the above-described fact, it is conceivable that the dielectric ceramics is sublimated and partly dissolved in the modified zone 18, resulting in a thin film (dissolved layer). It is conceivable that crystal or amorphous different from the Perovskite structure is formed in the dissolved layer. In addition, it is conceivable that the voids B in the modified zone 18 may be generated during the formation of the dissolved layer.

In the modified zone 18 not covered with the external electrodes 14, 15 of the ceramic chip 11, the polycrystal of the dielectric ceramics is coated by the dissolved layer.

The dissolved layer of the modified zone 18 functions as a reinforcement layer for reinforcing the polycrystal of the dielectric ceramics.

(2) Electron Beam

Figure 6:
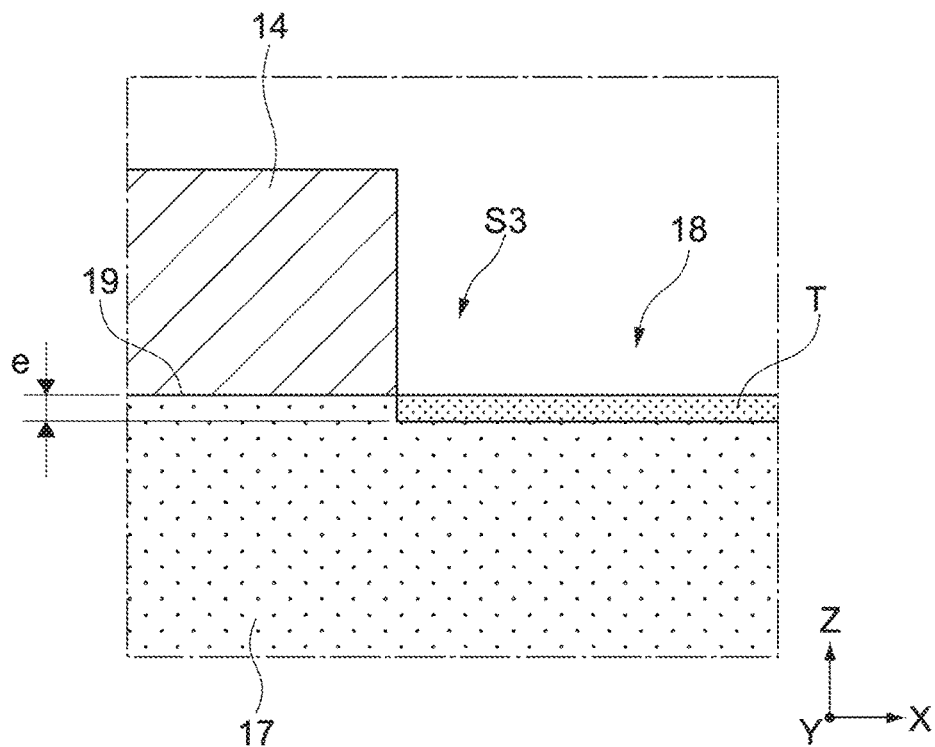
FIG. 6 is an enlarged partial cross-sectional diagram of an area surrounded by a chain line of the multi-layer ceramic capacitor in FIG. 2.

FIG. 6 is an enlarged schematic diagram of an area surrounded by a chain line of the multi-layer ceramic capacitor 10 in FIG. 2 where the modified zones 18 are formed by irradiating an electron beam to all regions of the modified zone 18 one time.

As shown in FIG. 6, when a cross section of the modified zone 18 is observed, a thin layer T different from the polycrystal of the dielectric ceramics is identified. The thickness of the thin layer T can be controlled freely by an electron beam intensity, an irradiation time, an irradiation number, etc., and may be about 1 μm, for example.

In the electron beam irradiation, the modified zone 18 can be formed by single time irradiation, There is no need to scan like the laser irradiation. Thus, in the electron beam irradiation, the level difference between the modified zone 18 and the covered part 19 is less generated dissimilar to the laser irradiation.

It is conceivable that the polycrystal of the dielectric ceramics is modified in the modified zone 18 by the electron beam irradiation, resulting in a thin layer T. It is conceivable that crystal or amorphous different from the Perovskite structure is formed in the thin layer T.

In the modified zone 18 not covered with the external electrodes 14, 15 of the ceramic chip 11, the polycrystal of the dielectric ceramics is coated by the thin layer T. The thin layer T of the modified zone 18 functions as a reinforcement layer for reinforcing the polycrystal of the dielectric ceramics.

2. METHOD OF PRODUCING MULTI-LAYER CERAMIC CAPACITOR 10

Figure 7:
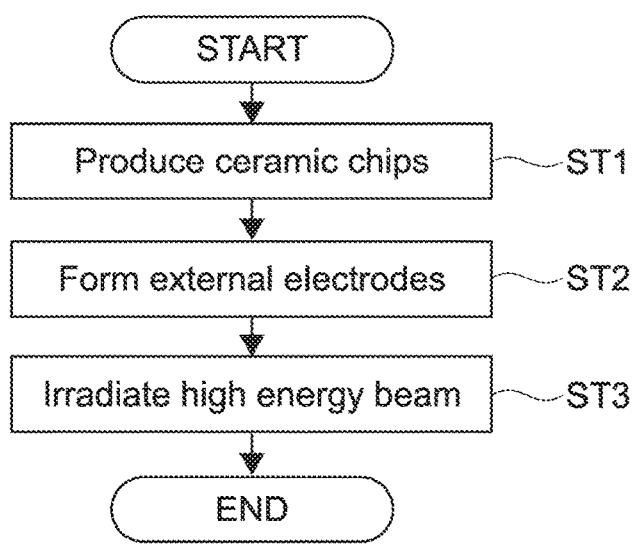
FIG. 7 is a flow chart showing a method of producing the multi-layer ceramic capacitor.
Figure 8:
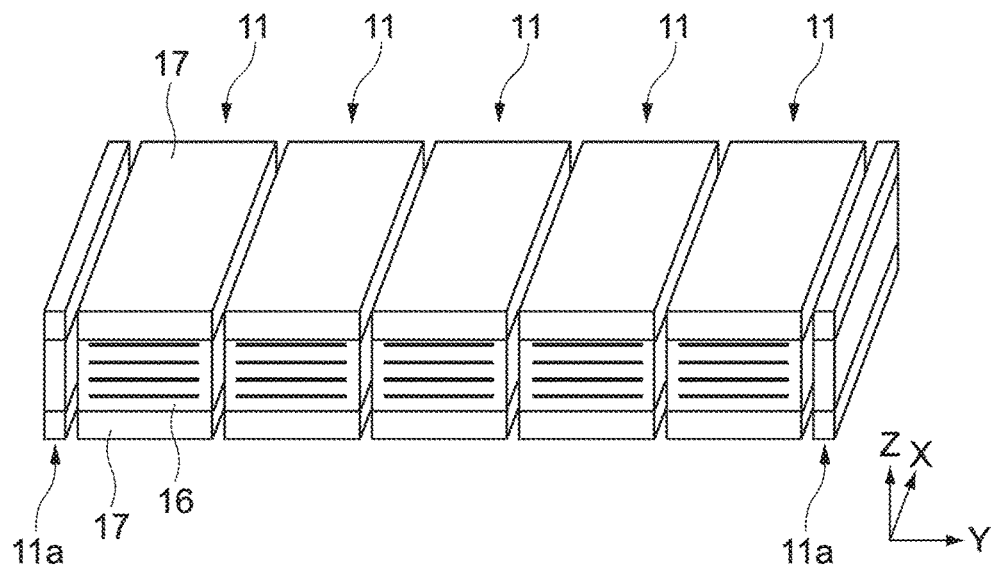
FIG. 8 is a diagram of illustrating a process of producing ceramic chips in the production method.
Figure 9:
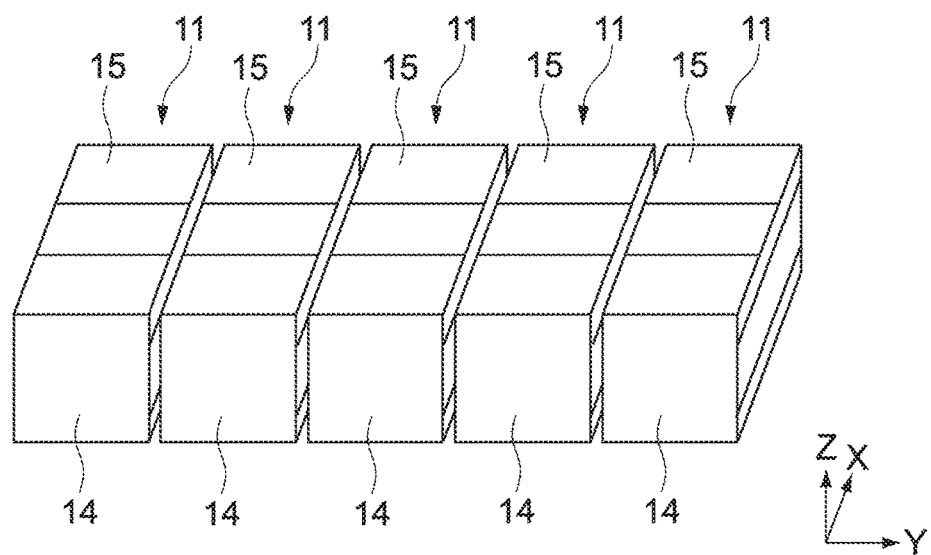
FIG. 9 is a diagram of illustrating a process of forming external electrodes in the production method.
Figure 10:
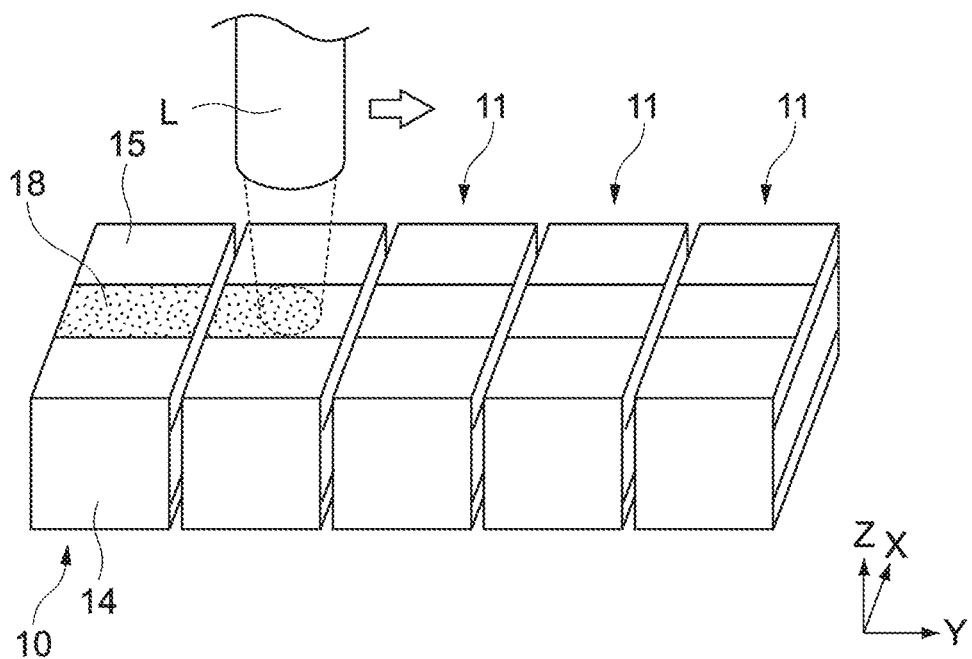
FIG. 10 is a diagram of illustrating a process of irradiating a high energy beam in the production method.

FIG. 7 is a flow chart showing a method of producing the multi-layer ceramic capacitor 10. FIGS. 8 to 10 each is a diagram showing a production process of the multi-layer ceramic capacitor 10. Hereinafter, the method of producing the multi-layer ceramic capacitor 10 will be described along FIG. 7 referring to FIGS. 8 to 10 as appropriate.

2.1 Step ST1: Process of Producing Ceramic Chips

In step ST1, the ceramic chips 11 are produced.

FIG. 8 is a perspective diagram of the ceramic chips 11 produced in step ST1. The ceramic chips 11 are produced by using a production process of a general multi-layer ceramic capacitor.

Specifically, ceramic sheets on which the internal electrodes 12, 13 are printed in a predetermined pattern are laminated and pressed to provide a ceramic block where unsintered ceramic chips 11 are successively formed along the X axis and Y axis directions. Next, the ceramic block is singulated into ceramic chips 11. By sintering the singulated, unsintered ceramic chips 11, the ceramic chips 11 shown in FIG. 8 are provided. Ends of the ceramic block are removed as end materials 11a.

2.2 Step ST2: Process of Forming External Electrodes

In step ST2, the ceramic chips 11 produced in step ST1 are lined in the Y axis direction, thereby forming the external electrodes 14, 15.

FIG. 9 is a perspective diagram of the ceramic chips 11 where the external electrodes 14, 15 are formed. The first external electrodes 14 cover the end surfaces S1 of the ceramic chips 11 in the X axis direction. The second external electrodes 15 cover the end surfaces S2 facing the end surfaces S1 of the ceramic chips 11.

The external electrodes 14, 15 are formed of a metal material. The external electrodes 14, 15 may be formed of copper (Cu), nickel (Ni), silver (Ag), gold (Au), palladium (Pd), tungsten (W), molybdenum (Mo), chromium (Cr), or an alloy thereof for example. Furthermore, the external electrodes 14, 15 may have a multi-layer structure including a plurality of layers formed of different materials from each other.

The external electrodes 14, 15 may be formed by using a film-forming process such as a sputtering method, a vapor deposition method, a CVD (chemical Vapor Deposition) method, and a plating method. In addition, the external electrodes 14, 15 may be formed by using a process other than the film-forming process, such as a screen printing method and a dip method.

When the external electrodes 14, 15 are formed, masks may be formed in advance at the center regions of the modified zones 18 in the ceramic chips 11 in the X axis direction. In this manner, the external electrodes 14, 15 are not formed at the center regions in the ceramic chips 11, and the external electrodes 14, 15 apart from each other are provided. The masks are peeled after the external electrodes 14, 15 are formed.

In order to form the external electrodes 14, 15 having the predetermined thickness, a plurality of processes may be combined. For example, a copper sputter layer may be firstly formed, and a copper plating layer may be formed thereon. In this case, the masks may be peeled before the copper plating layer may be formed.

When a thick-film process such as a dip method is used for the formation of the external electrodes 14, 15, an electrical conductive paste corresponding to the external electrodes 14, 15 may be applied to the unsintered ceramic chips 11, and the ceramic chips 11 may be then sintered. By the configuration, by sintering the ceramic chips 11, the electrical conductive paste can also be sintered, whereby a process of baking the electrical conductive paste to the ceramic chips 11 can be omitted.

2.3 Step ST3: Process of Irradiating High Energy Beam

In step ST3, the main surfaces S3 of the ceramic chips 11 where the external electrodes 14, 15 are formed are irradiated with a high energy beam.

FIG. 10 is a diagram showing that the ceramic chips 11 are irradiated with laser by a laser irradiation apparatus L, by way of example.

In the example of FIG. 10, a spot diameter of the laser is equal to a width of each modified zone 18. When the ceramic chips 11 arranged in the Y axis direction are scanned over full widths by the laser irradiation apparatus L one time, thereby completing the modified zones 18.

The modified zones 18 may be formed by scanning by a plurality of times by the laser irradiation apparatus L, i.e., by irradiating laser by a plurality of times. When the spot diameter of the laser is smaller than the width of each modified zone 18, a scanning orbit of the laser irradiation apparatus L can be determined as appropriate such that all regions of the modified zones 18 can be irradiated with laser.

As the laser irradiation apparatus L, a pulse laser apparatus having a short pulse width is desirably used. In this manner, the dielectric ceramics in the modified zones 18 can be successfully sublimated. As described above, by observing the surface microstructure, it is identified that the dielectric ceramics in the modified zones 18 are dissolved. It can prevent the covers 17 from damaging by excessive dissolution.

In this embodiment, as the laser irradiation apparatus L, a pico-second laser apparatus having a pulse width in a pico-second range was used. Other than the pico-second laser apparatus, a femto-second laser apparatus having a pulse width in a femto-second range may be used, for example.

The irradiation apparatus for irradiating a high energy beam can be selected by a type of the high energy beam, as appropriate. For example, when the electron beam is used as the high energy beam, an electron gun can be used as the irradiation apparatus.

2.4 Others

In this embodiment, after the external electrodes 14, 15 are formed in step ST2, a high energy beam is irradiated in step ST3. The sequence of step ST2 and step ST3 may be reversed. That is to say, after the main surfaces S3 of the ceramic chips 11 may be irradiated with a high energy beam, the external electrodes 14, 15 may be formed. In this case, the modified zones 18 may be formed over all regions of the main surfaces S3 of the ceramic chips 11.

Also, step ST2 may be carried out before and after step ST3, separately. For example, a copper sputter layer may be formed before step ST3, and a copper plating layer may be formed after step ST3.

Furthermore, a timing of singulation into the ceramic chips 11 may be determined, as appropriate. That is to say, although the singulation is performed in step ST1 according to this embodiment, the timing of singulation may be after the external electrodes 14, 15 are formed in step ST2, or after a high energy beam may be irradiated in step ST3.

3. MODIFIED EXAMPLE

Hereinafter, a method of producing the multi-layer ceramic capacitor 10 according to a modified example will be described. In this modified example, the process of forming the external electrodes (step ST2) and the process of irradiating a high energy beam (step ST3) are different from the above-described embodiment.

3.1 Step ST2: Process of Forming External Electrodes

In step ST2, the ceramic chips 11 produced in step ST1 are arranged along the Y axis, and electrical conductive layers 120 are formed of an electrical conductive material on the ceramic chips 11.

Figure 11:
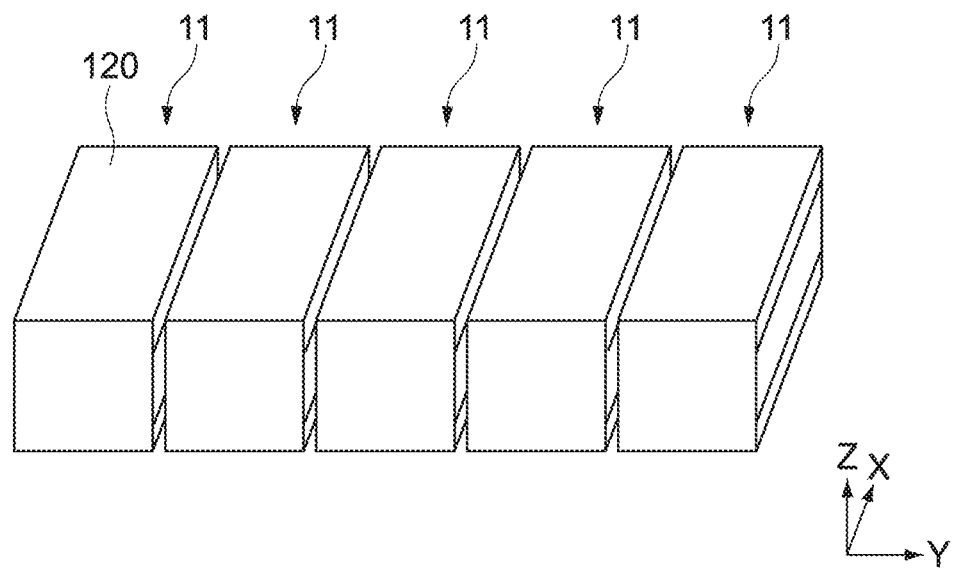
FIG. 11 is a diagram of illustrating a process of forming external electrodes in a modified example of the production method.

FIG. 11 is a perspective diagram of the ceramic chips 11 where the electrical conductive layers 120 are formed. In this modified example, no mask is used when the electrical conductive layers 120 are formed, dissimilar to the above-described embodiment. That is to say, the electrical conductive layers 120 are formed over all regions of the end surfaces S1, S2 and the main surfaces S3 of the ceramic chips 11. According to this modified example, as there is no need to use a mask, step ST2 is simpler than the above-described embodiment, thereby improving mass productivity.

The electrical conductive layers 120 are formed uniformly in thicknesses such that they can be removed by irradiating a high energy beam in step ST3. The thicknesses of the electrical conductive layers 120 are desirably within a range from 10 nm or more to 20 μm or less. The metal material and the film-forming process used for forming the electrical conductive layers 120 may be similar to those used for the external electrodes 14, 15 according to the above-described embodiment.

3.2 Step ST3: Process of Irradiating High Energy Beam

In step ST3, the center regions of the main surfaces S3 of the ceramic chips 11 in the X axis direction where the electrical conductive layers 120 are formed in step ST2 are irradiated with a high energy beam.

Figure 12:
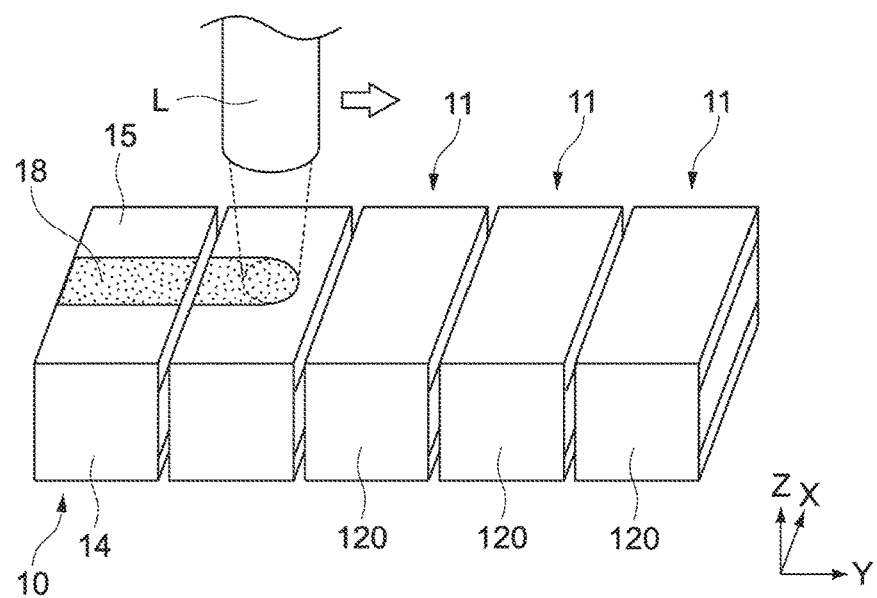
FIG. 12 is a diagram of illustrating a process of irradiating a high energy beam in the modified example of the production method.

FIG. 12 is a diagram showing that the center regions of the main surfaces S3 of the ceramic chips 11 in the X axis direction are irradiated with laser by the laser irradiation apparatus L, by way of example. When the electrical conductive layers 120 are removed by the laser irradiation, the surfaces of the ceramic chips 11 are exposed, and laser is incident on the exposed surfaces of the ceramic chips 11. Thus, the modified zones 18 are inevitably formed at the regions where the electrical conductive layers 120 on the main surfaces S3 of the ceramic chips 11 are removed.

By scanning the laser irradiation apparatus L in the Y axis direction and irradiating the arranged ceramic chips 11 with laser over full widths in the Y axis direction, the electrical conductive layers 120 on the main surfaces S3 are segmented into the first external electrodes 14 and the second external electrodes 15. In this manner, by the laser irradiation, the first external electrodes 14, the second external electrodes 15, and the modified zones 18 are formed at the same time.

In this modified example, the main surfaces S3 of the ceramic chips 11 include the regions covered with the external electrodes 14, 15, and the regions where the modified zones 18 are disposed. Accordingly, the main surfaces S3 of the ceramic chips 11 have high strength over all regions. As a result, it can provide the multi-layer ceramic capacitor 10 having a high bending strength.

As the laser irradiation apparatus L, a pulse laser apparatus having a short pulse width is desirably used. In this manner, the electrical conductive layers 120 can be removed appropriately, and successful sublimation may be made in the modified zones 18. It can prevent the covers 17 from damaging by excessive dissolution in the modified zones 18.

Also in the modified example, the laser irradiation apparatus L can be used similar to the above-described embodiment. In the modified example, a pico-second laser apparatus having a pulse width in a pico-second range was used as the laser irradiation apparatus L.

In the multi-layer ceramic capacitor 10 provided in the modified example, as the electrical conductive layers 120 are removed by the laser irradiation, ends of the external electrodes 14, 15 have convex/concave shapes corresponding to a spot shape of the laser.

In general, when loads are applied to the multi-layer ceramic capacitor 10 in the Z axis direction, a stress is easily concentrated on the ends of the external electrodes 14, 15, and cracks are easily generated near the ends of the external electrodes 14, 15 of the ceramic chips 11.

In that respect, when loads are applied to the multi-layer ceramic capacitor 10 according to the modified example in the Z axis direction, a stress is dispersed at the ends having the convex/concave shapes of the external electrodes 14, 15. Thus, in the multi-layer ceramic capacitor 10 according to the modified example, cracks less occur near the ends of the external electrodes 14, 15 of the ceramic chips 11.

Also in the production method according to the above-described embodiment, similar to the modified example, the laser is irradiated across the ends of the external electrodes 14, 15 in step ST3, whereby the ends of the external electrodes 14, 15 have the convex/concave shapes. In this manner, also in the multi-layer ceramic capacitor 10 according to the above-described embodiment, similar to the multi-layer ceramic capacitor 10 according to the modified example, it can inhibit cracks near the ends of the external electrodes 14, 15 of the ceramic chips 11 from generating.

It should be appreciated that a high energy beam other than laser can also be used in the modified example. In this case, the parts corresponding to the external electrodes 14, 15 of the electrical conductive layer 120 are masked as necessary, whereby the parts corresponding to the modified zones 18 of the electrical conductive layer 120 can be selectively removed.

3.3 OTHERS

In the modified example, as the electrical conductive layers 120 have to be removed by the high energy beam irradiation in step ST3 the thicknesses of the electrical conductive layers 120 formed in step ST2 are limited. Thus, if the thicknesses of the external electrodes 14, 15 are insufficient in the electrical conductive layers 120 formed in step ST2, the thicknesses of the external electrodes 14, 15 have to be increased after step ST3.

By way of example, in order to increase the thicknesses of the external electrodes 14, 15, a plating method can be used. For example, after a copper sputter layer is formed in step ST2 and a high energy beam is irradiated in step ST3, a copper plating layer may be formed on the copper sputter layer.

Furthermore, a timing of singulation into the ceramic chips 11 may be determined, as appropriate. That is to say, although the singulation is performed in step ST1 according to this embodiment, the timing of singulation may be after the electrical conductive layers 120 are formed in step ST2, or after a high energy beam may be irradiated in step ST3.

4. EXAMPLES

4.1 Production of Multi-layer Ceramic Capacitor 10

The multi-layer ceramic capacitors 10 according to Example and Comparative Example were produced.

The multi-layer ceramic capacitor 10 in Example was produced according to the production method in the modified example of the above-described embodiment.

The multi-layer ceramic capacitor 10 in Comparative Example was produced according to the production method in the embodiment without carrying out the process of irradiating a high energy beam in step ST3.

In the multi-layer ceramic capacitors 10 according to Example and Comparative Example, there is a difference whether or not the modified zones 18 are present, and other configurations are common.

The external electrodes 14, 15 of the multi-layer ceramic capacitors 10 according to Example and Comparative Example include a copper sputter layer having a thickness of 0.5 μm, and a copper plating layer having a thickness of 8 μm.

In Example, after the copper sputter layer was formed, the modified zones 18 were formed by irradiating a high energy beam, and the copper plating layer was then formed.

In Comparative Example, after the copper sputter layer was formed with the regions between the external electrodes 14, 15 being masked, the mask was peeled, and the copper plating layer was then formed.

In the process of irradiating a high energy beam in step ST3 in Example, a pico-second laser apparatus was used, and green laser was scanned at a laser diameter of 10 to 30 μm, a laser frequency of 50 kHz, and a scan speed of 65 m/s to form the modified zones 18.

4.2 Evaluation of Multi-layer Ceramic Capacitor 10

Samples of the multi-layer ceramic capacitors 10 according to Example and Comparative Example were evaluated for a bending strength, etc.

First, the samples of the multi-layer ceramic capacitors 10 according to Example and Comparative Example were evaluated for a bending strength.

For the respective 20 samples in Example and Comparative Example, with the external electrodes 14, 15 being supported, loads were applied to the center parts between the external electrodes 14, 15 in a thickness direction (in the Z axis direction in FIG. 1, etc.). The loads were gradually increased. The sample where a crack was generated was determined as failure. The samples in Example and Comparative Example were evaluated for the loads at which the failures were generated, i.e., the bending strengths.

Figure 13:
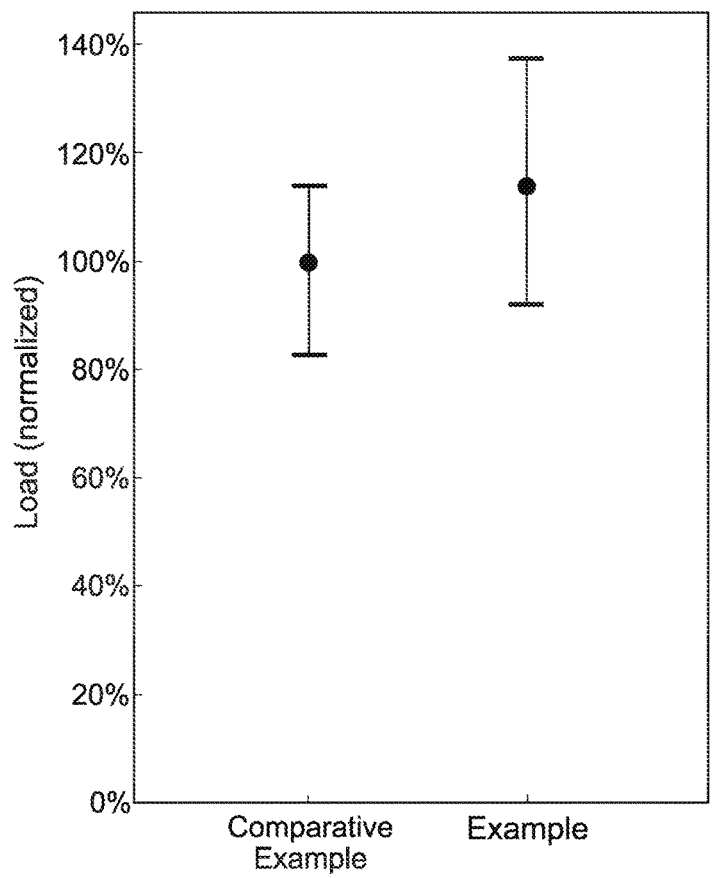
FIG. 13 is a graph showing evaluation results of bending strengths of the multi-layer ceramic capacitors.

FIG. 13 is a graph showing evaluation results of the bending strengths. A vertical axis in FIG. 13 represents the loads at which the failures of the samples are generated. FIG. 13 shows averages of the loads of the samples in Example and Comparative Example in plots, and deviations of the loads of the samples in Example and Comparative Example in error bars. Note that FIG. 13 shows the loads normalized such that the average of the loads of the sample in Comparative Example is set to 100%.

Referring to FIG. 13, it is found that the samples in Example did not suffer the failures to the loads greater than the loads in the samples in Comparative Example. When the samples in Example were evaluated from the average values of the loads, it is found that the samples in Example can withstand the loads greater by about 10% than the loads in the samples in Comparative Example.

Thus, the samples in Example where the modified zones 18 were disposed had the bending strength greater than the samples in Comparative Example where no modified zones 18 were disposed.

The samples of the multi-layer ceramic capacitors 10 in Example and Comparative Example were evaluated for a life property, a leak current, and moisture resistance. There is little difference between them.

As described above, it was confirmed that the bending strength of the multi-layer ceramic capacitor 10 was improved by disposing the modified zones 18. Also, it was confirmed that even if the modified zones 18 were disposed, the life property, the leak current, and the moisture resistance of the multi-layer ceramic capacitor 10 were not adversely affected.

5. OTHER EMBODIMENTS

While the embodiment of the present invention has been described, the present invention is not limited to the above-described embodiment, and it should be appreciated that variations and modifications may be made without departing from the gist of the present invention.

For example, in the above-described embodiment, as an example of the ceramic electronic component, the multi-layer ceramic capacitor has been described. It is possible to improve the bending strength by disposing the modified zones as long as the ceramic electronic component includes a pair of electrode units. Examples of the ceramic electronic component include a ceramic inductor, a ceramic varistor, and a piezo-ceramic element.

Also, in the embodiment, the modified zones are disposed on the main surfaces of the multi-layer ceramic capacitor. However, when the modified zones are disposed on at least one of the main surfaces of the multi-layer ceramic capacitor, the bending strength of the multi-layer ceramic capacitor can be improved.

What is claimed is:

1. A ceramic electronic component, comprising:
   a ceramic chip formed of a material having a Perovskite structure including titanium and barium as main components, the ceramic chip having a first surface, a second surface, a third surface, a fourth surface, a fifth surface, and a sixth surface; the first surface and the second surface both being perpendicular to a first direction, the third surface and the fourth surface both being perpendicular to a second direction that is orthogonal to the first direction, and the fifth surface and the sixth surface both being perpendicular to a third direction that is orthogonal to the first direction and the second direction, wherein a thickness of the ceramic chip measured in the second direction is smaller than a thickness of the ceramic chip measured in the first direction and a thickness of the ceramic chip measured in the third direction;
   a first electrode unit coating the first surface;
   a second electrode unit coating the second surface apart from the first electrode unit; and
   a modified zone disposed on the third surface and formed of crystal or an amorphous material, the crystal or amorphous material being different from a Perovskite structure of the ceramic chip and having a main component in common with the ceramic chip;
   wherein the third surface includes a first covered part covered with the first electrode unit, and a second covered part covered with the second electrode unit, and
   wherein the modified zone is disposed between the first covered part and the second covered part.

2. The ceramic electronic component according to claim 1, wherein the modified zone includes dispersed voids.

3. The ceramic electronic component according to claim 1, wherein the third surface is concave in the modified zone.

4. The ceramic electronic component according to claim 1, wherein the modified zone includes a layer having a microstructure different from the ceramic chip.

5. The ceramic electronic component according to claim 1, wherein the ceramic chip includes
   first internal electrodes extending in parallel with the third surface, and connected to the first electrode unit,
   second internal electrodes facing the first internal electrodes, and connected to the second electrode unit, and
   dielectric ceramics covering the first internal electrodes and the second internal electrodes.

* * * * *